(12) United States Patent
Voigt et al.

(10) Patent No.: US 10,473,497 B2
(45) Date of Patent: Nov. 12, 2019

(54) MAGNETO-INDUCTIVE FLOW MEASURING DEVICE HAVING CABLE STRANDS EXTENDING IN GROOVES ON THE CORE BODY WITHIN A COIL COMPONENT

(71) Applicant: Endress + Hauser Flowtec AG, Reinach (CH)

(72) Inventors: Frank Voigt, Weil am Rhein (DE); Günther Bähr, Therwil (CH); Thomas Küng, Basel (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 184 days.

(21) Appl. No.: 15/326,739

(22) PCT Filed: Jul. 16, 2015

(86) PCT No.: PCT/EP2015/066257
§ 371 (c)(1),
(2) Date: Jan. 17, 2017

(87) PCT Pub. No.: WO2016/012337
PCT Pub. Date: Jan. 28, 2016

(65) Prior Publication Data
US 2018/0209828 A1    Jul. 26, 2018

(30) Foreign Application Priority Data
Jul. 25, 2014  (DE) .................... 20 2014 103 426 U

(51) Int. Cl.
*G01F 1/58*   (2006.01)
*G01F 25/00*  (2006.01)

(52) U.S. Cl.
CPC .............. *G01F 1/586* (2013.01); *G01F 1/588* (2013.01); *G01F 25/0007* (2013.01)

(58) Field of Classification Search
None
See application file for complete search history.

(56) References Cited

U.S. PATENT DOCUMENTS

| 4,830,577 A * | 5/1989 | Moffatt ................ F04B 43/04 |
|---|---|---|
| | | 417/413.1 |
| 4,899,593 A | 2/1990 | Inami et al. |

(Continued)

FOREIGN PATENT DOCUMENTS

| CN | 1035891 A | 9/1989 |
|---|---|---|
| CN | 1954195 A | 4/2007 |

(Continued)

OTHER PUBLICATIONS

Office Action dated Oct. 19, 2018 issued in corresponding Chinese application No. 201580033153.9.

(Continued)

*Primary Examiner* — Harshad R Patel
(74) *Attorney, Agent, or Firm* — Bacon & Thomas, PLLC

(57) ABSTRACT

A magneto-inductive flow measuring device for ascertaining flow of a measured medium through a measuring tube having a measuring tube axis, comprising: at least a first coil component having a coil body for accommodating a coil core of a coil. The coil is wound on the coil body and the coil core is arranged in a first passageway of the coil body with a longitudinal axis of the coil core coaxial with the coil. At least two cable strands are arranged between the coil core and the coil body, wherein the cable strands serve for tapping the signal of two or more measuring electrodes arranged on the measuring tube. The cable strands extend within the coil component essentially along a cutting plane, which extends perpendicular to the measuring tube axis.

16 Claims, 4 Drawing Sheets

(56) References Cited

U.S. PATENT DOCUMENTS

| | | | | |
|---|---|---|---|---|
| 9,068,868 B2* | 6/2015 | Voigt | ............... | G01F 1/586 |
| 2012/0297891 A1* | 11/2012 | Voigt | ............... | G01F 1/584 |
| | | | | 73/861.11 |
| 2014/0260526 A1* | 9/2014 | Tsutsui | ............. | G01L 5/0028 |
| | | | | 73/12.01 |

FOREIGN PATENT DOCUMENTS

| | | |
|---|---|---|
| CN | 102725614 A | 10/2012 |
| DE | 3908698 A1 | 9/1989 |
| DE | 102004014295 A1 | 10/2005 |
| DE | 102010001393 A1 | 8/2011 |
| WO | WO2004072590 A1 | 8/2004 |
| WO | 2005/093376 A3 | 10/2005 |

OTHER PUBLICATIONS

Internatonal Search Report, EPO, The Netherlands—dated Oct. 9, 2015.

English Translation of the International Preliminary Report on Patentability, WIPO, Geneva, CH,—dated Feb. 9, 2017.

\* cited by examiner

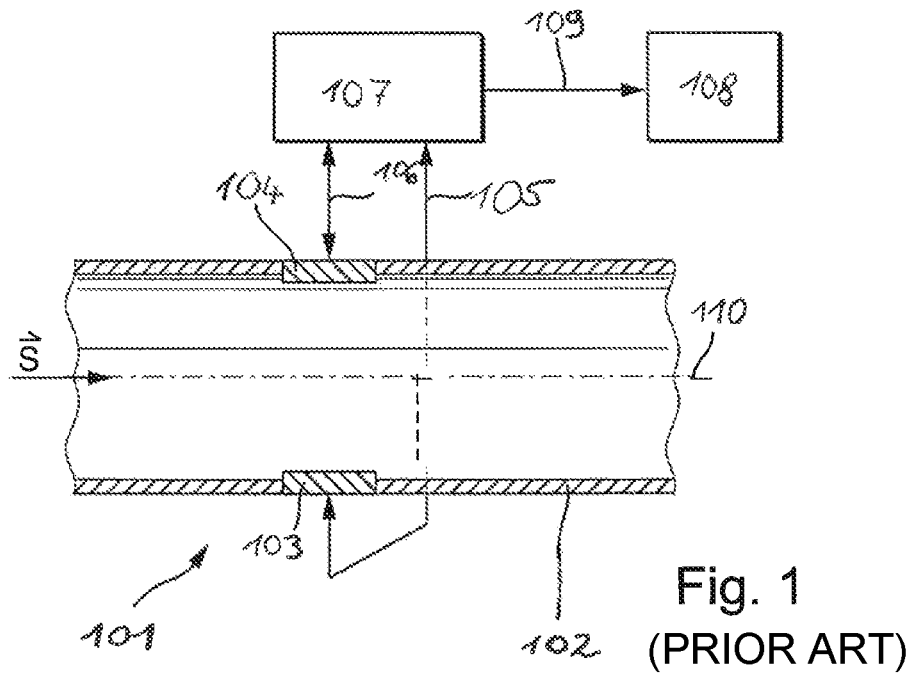
Fig. 1
(PRIOR ART)
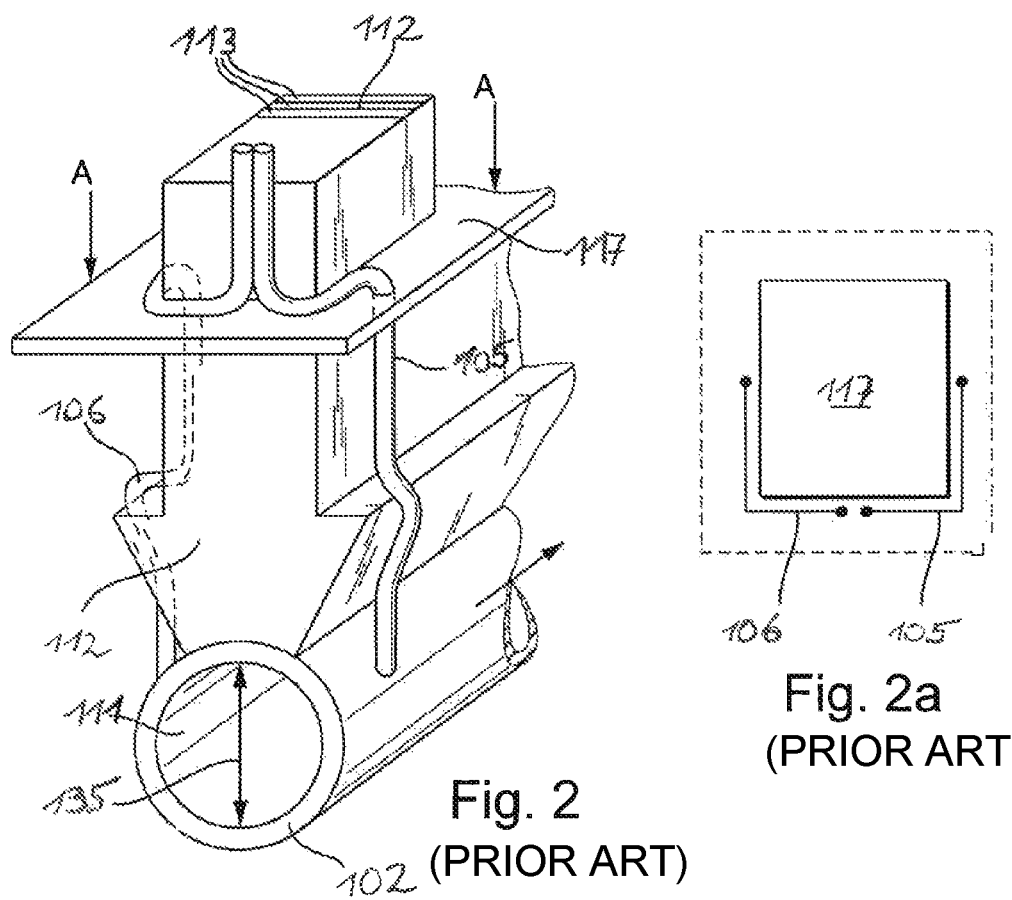
Fig. 2
(PRIOR ART)
Fig. 2a
(PRIOR ART)

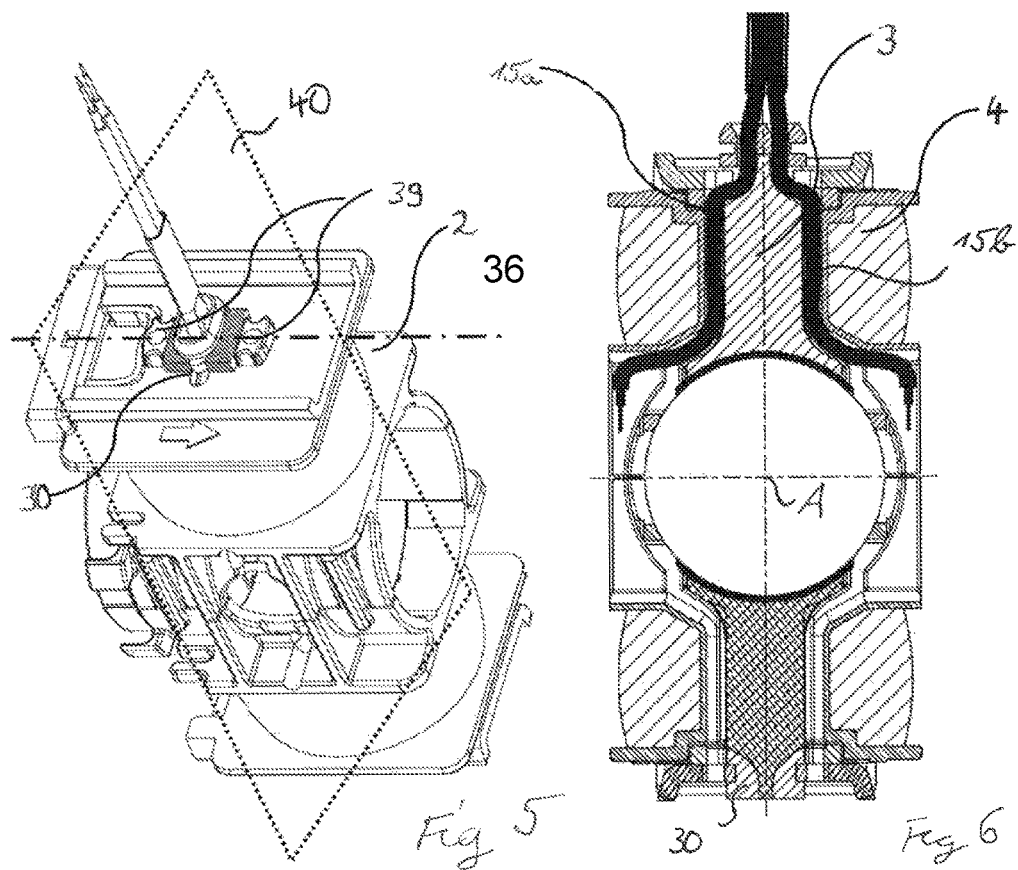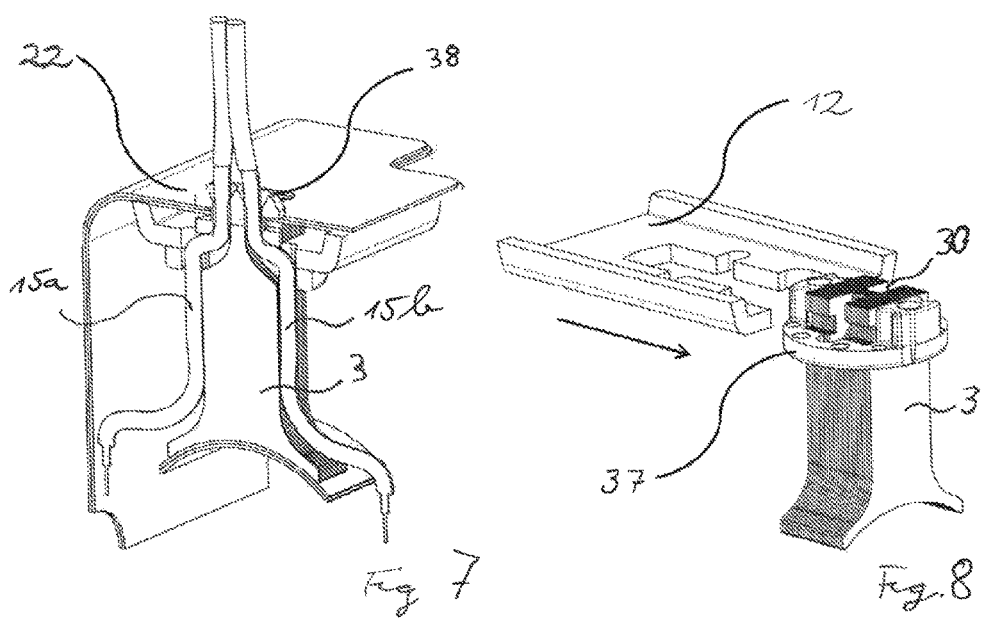

MAGNETO-INDUCTIVE FLOW MEASURING DEVICE HAVING CABLE STRANDS EXTENDING IN GROOVES ON THE CORE BODY WITHIN A COIL COMPONENT

TECHNICAL FIELD

The present invention relates to a magneto-inductive flow measuring device.

BACKGROUND DISCUSSION

Magneto-inductive flow measuring devices utilize for volumetric flow measurement the principle of electrodynamic induction and are known from a large number of publications. Charge carriers of the medium moved perpendicularly to a magnetic field induce a measurement voltage in measuring electrodes arranged essentially perpendicularly to the flow direction of the medium and perpendicularly to the direction of the magnetic field. The measurement voltage induced in the measuring electrodes is proportional to the flow velocity of the medium averaged over the cross section of the measuring tube and is, thus, proportional to the volume flow rate. If the density of the medium is known, the mass flow in the pipeline, respectively in the measuring tube, can be determined. The measurement voltage is usually tapped via a pair of measuring electrodes, which is arranged, relative to the coordinate along the measuring tube axis, in the region of maximum magnetic field strength and where, thus, the maximum measurement voltage is to be expected.

Published international patent application, WO 2004/072590 A1 discloses a magneto-inductive flow measuring device having two coil bodies arranged lying oppositely on a measuring tube. Each coil body comprises a coil and a pole shoe as coil core. The pole shoe extends into a first passageway of the coil body along the coil axis. It includes a protrusion, which is so embodied that the measuring tube is contactable by the pole shoe approximately gap-freely. The coil bodies are prestressed toward one another by means of two field guide-back elements. In this way, the respective pole shoes are pressed against the measuring tube.

German Patent, DE 10 2004 014 300 A1 describes a magneto-inductive flow measuring device as shown in FIGS. 1 and 2.

A flow measuring device of the field of the invention is additionally disclosed in German patent, DE 10 2010 001 393 A1. This flow measuring device is shown in FIGS. 3 and 4. This flow measuring device is distinguished especially by its fast, cost effective and uncomplicated manufacturability.

SUMMARY OF THE INVENTION

An object of the invention is, to begin with, to lessen a measurement error by a special cable guidance.

The object is achieved by, a magneto-inductive flow measuring device for ascertaining flow of a measured medium through a measuring tube having a measuring tube axis, including at least a first coil component having a coil body for accommodating a coil core of a coil, wherein the coil is wound on the coil body and wherein the coil core is arranged in a first passageway of the coil body with a longitudinal axis of the coil core coaxial with the coil.

In the case of the magneto-inductive flow measuring device of the invention, at least two cable strands are arranged between the coil core and the coil body, wherein the cable strands serve for tapping the signal of two or more measuring electrodes arranged on the measuring tube.

The cable strands extend within the coil component essentially along a cutting plane, which extends perpendicularly to the measuring tube axis. Cable strands often have a certain amount of stiffness. Therefore, they can protrude somewhat from the plane. The protrusion from the plane should, however, not be more than twice the cable diameter.

By guiding the cable essentially parallel to the magnetic field, the measuring performance of the flow measuring device can be improved.

It is advantageous when the coil core has at least two cavities, wherein each of these cavities is provided for guiding a respective one of the cable strands. The cavities are especially advantageously arranged terminally in the coil core. The cavities provide a reliable guiding of the cables.

Advantageously, the cavities and the coil core are arranged relative to the coil body in such a manner that the cable guidance of the two cable strands occurs symmetrically, at least in the region of the coil component.

The cable strands are advantageously led in certain regions in the coil component parallel to a longitudinal axis B of the coil core.

The coil core is in an advantageous embodiment a single component composed of core sheet metal pieces connected with one another. The cavity is, in such case, bounded by two core sheet metal pieces.

It is advantageous when one, especially both, of the two cable strands is/are led in such a manner that it/they has/have in the cutting plane essentially two bends of greater than 30°, especially greater than 60°, and a third bend of greater than 15°, especially greater than 30°.

It is especially advantageous, when the coil core has a protrusion and wherein the coil body has a first stop, which is arranged between the measuring tube and coil, wherein the protrusion of the coil core in the assembled state of the first coil component lies against the first stop of the coil body and prevents a shifting of the coil core relative to the coil body along the longitudinal axis of the coil core in a first direction facing away from the measuring tube, wherein the coil body has a second stop on an end of the coil body facing away from the measuring tube, wherein the coil core is secured to the coil body with a securement element, which in the assembled state lies against the second stop of the coil body under a prestress along the longitudinal axis of the coil core between the first stop and the second stop of the coil body.

It is especially advantageous, when the coil core is formed as a pole shoe.

It is additionally advantageous, when the coil core has a groove and the securement element has at least one projection fitting the groove of the coil core, wherein coil core and securement element are connected with one another via a shape interlocking connection of groove and projection.

In an additional advantageous embodiment, the coil body has at least a third stop, wherein the securement element lies against the third stop in the assembled state, whereby a shifting of the securement element in a second direction, perpendicular to the first direction, is prevented and whereby a shifting of the securement element in a third direction, perpendicular to the first and second directions, is prevented.

It is additionally advantageous, when at least one pole shoe sheet metal piece is arranged between coil core and measuring tube.

In such case, each pole shoe sheet metal piece can in advantageous manner in the assembled state of the coil body be separately snapped into a depression provided in the coil body.

The first coil component and a second coil component are advantageously arranged oppositely lying on the measuring tube, wherein the coils are so connected that the magnetic field produced by them points in a common direction.

The first coil component and the second coil component are especially connected with one another by shape-interlocking under a prestress coaxial with the longitudinal axis of the coil core.

It is advantageous, when the first coil component and the second coil component are essentially complementarily constructed.

In an advantageous embodiment, the coil body includes at least one cable guide for guiding a cable, so that the led cable of a predetermined length does not exceed a predetermined separation from the coil body.

Further developments and embodiments of the inventions are reflected in the features of the dependent claims.

BRIEF DESCRIPTION OF THE DRAWINGS

The invention can have numerous forms of embodiment. Some thereof will now be explained in greater detail based on the appended figures of the drawing. Equal elements are provided in the figures with equal reference characters. The figures of the drawing show as follows:

FIG. 1 is a first coil arrangement of a magneto-inductive flow measuring device of the state of the art;

FIG. 2 is a perspective representation of a construction known from the state of the art for leading the signal lines between the measuring electrodes and the transmitter in the case of a magneto-inductive flow measuring device;

FIG. 2a is a plan view onto the pole shoe taken according to the cutting plane A of FIG. 2;

FIG. 5 shows perspectively, coil arrangements of a magneto-inductive flow measuring device of the invention;

FIG. 6 is a sectional view of the flow measuring device of the invention;

FIG. 7 is a perspective, sectional view of the cable guide in the flow measuring device of the invention; and FIG. 8 shows the holding of the coil core in the flow measuring device of the invention.

DETAILED DISCUSSION IN CONJUNCTION WITH THE DRAWINGS

Figure 3:
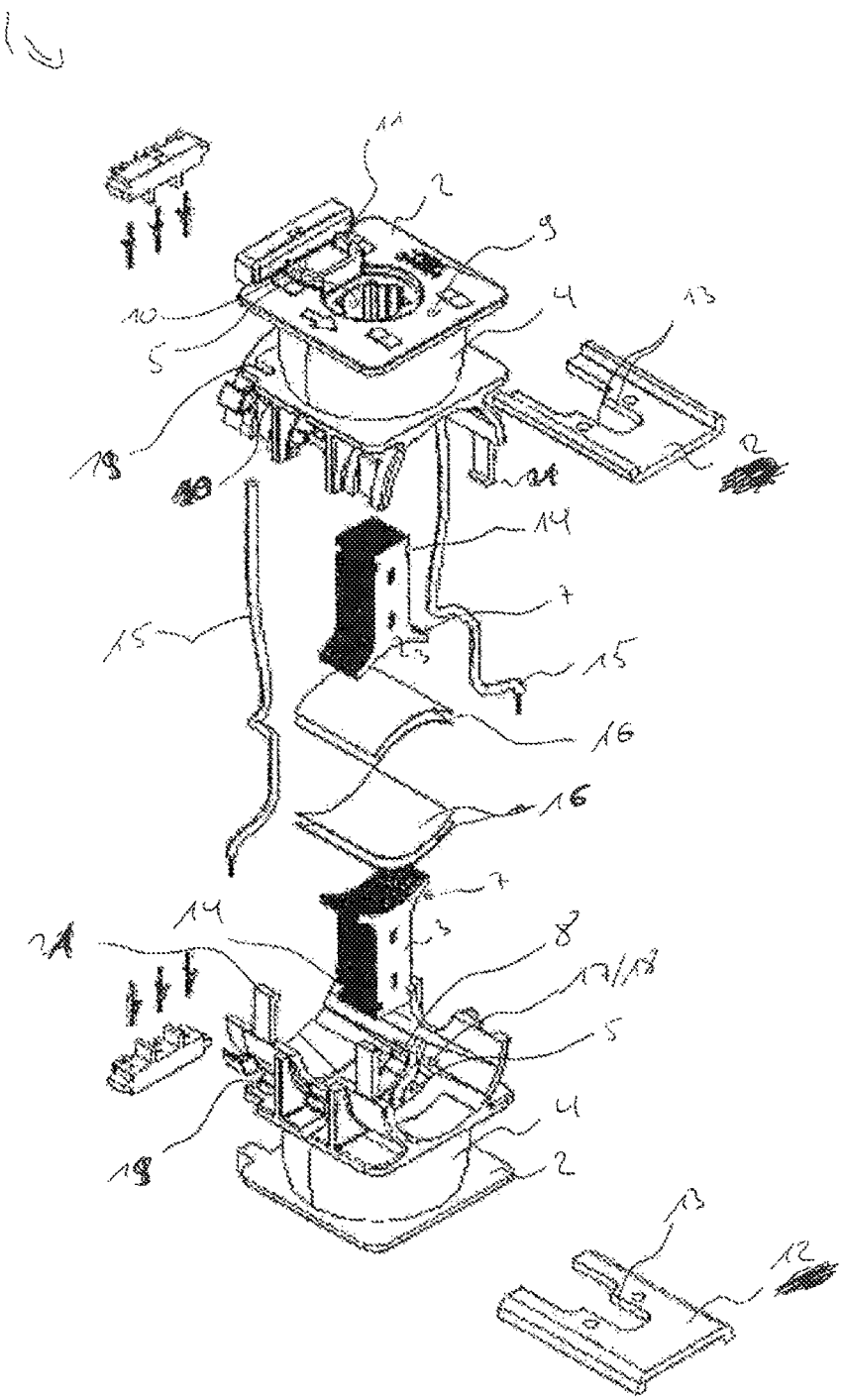
FIG. 3 shows two identical coil arrangements of a magneto-inductive flow measuring device of the state of the art in an exploded view.

FIG. 1 shows a schematic representation of a magneto-inductive flow measuring device 101 known from the state of the art. The measuring tube 102 of the flow measuring device is flowed through by a measured medium in the direction of the measuring tube axis 110. The measured medium is electrically conductive, at least to a slight extent. Measuring tube 102 is of a non-conductive material, or at least its interior is lined with a non-conductive material.

As a result of a magnetic field directed perpendicularly to the flow direction of the measured medium and usually produced by two diametrally arranged electromagnets (not shown in FIG. 1), charge carriers located in the measured medium migrate to the oppositely poled, measuring electrodes 103; 104. The voltage forming between the two measuring electrodes 103, 104 is proportional to the flow velocity of the measured medium averaged over the cross section of the measuring tube 102, i.e. it is a measure for the volume flow rate of the measured medium in the measuring tube 102. Measuring tube 102 is, moreover, connected via connecting elements (not shown) with a pipeline (not shown), through which the measured medium is flowing.

Via the signal lines 105, 106, the measuring electrodes 103, 104 are connected with the control/evaluation unit 107. Via the connecting line 109, furthermore, measurement data can be forwarded to the display unit 108.

FIGS. 2 and 2a show the guiding of the electrode cable between the measuring electrodes 103, 104 and the transmitter, which contains at least the control-evaluation unit 107. The electrode cables 105, 106 leading away from the measuring electrodes 103, 104 extend on oppositely lying lateral surfaces of a coil core 112 with integrated pole shoe. The oppositely lying coil core with integrated pole shoe of the magnet arrangement is not shown in FIG. 2. Coil core 112 is composed preferably of a plurality of assembled and rigidly interconnected, sheet metal pieces 113. This layered construction of the coil core 112 prevents eddy currents.

In the region of the cutting plane 117, the electrode cables 105, 106 show a changed direction. This is shown well in FIG. 2a, which is a plan view taken using the cutting plane 117. The area defined by the two electrode cables 105, 106 in this region is oriented perpendicular to the magnetic field produced by the magnet arrangement. In this region, the danger of disturbance currents being induced in the electrode cables 105, 106 is especially great.

As recognizable in FIGS. 1 and 2, the cable guidance of the signal lines 105 and 106 in the illustrated flow measuring device occurs laterally along the coil core 112. In such case, the signal lines are led away from a plane perpendicular to the measuring tube 102, so that they grip around the coil core 112.

FIG. 3 shows two equally constructed coil components 1 of a magneto-inductive flow measuring device of the state of the art. Such a flow measuring device is used e.g. in process measurements technology for ascertaining flow of a measured medium through a measuring tube (not shown in this figure). Each coil component 1 has a coil body 2 for accommodating a coil core 3 of a coil 4, wherein the coil 4 is wound on the coil body 2. Coil core 3 is arranged in a first passageway 5 of the coil body 2 coaxially with the coil 4. Coil core 3 is led shiftably in the direction of its longitudinal axis in the passageway at least such that, in the operationally ready state, it extends essentially perpendicularly to a measuring tube longitudinal axis.

In FIG. 3, the coil body 2 includes at least a first protrusion 7. In this example, the coil core 3 is formed with integrated pole shoe. A pole shoe serves for field guidance and is correspondingly formed. Coil core 3 performs here thus the function of a coil core and a pole shoe, especially for field line guidance in the measuring tube. This component could here alternatively also be referred to totally as a pole shoe. Protrusion 7 has here the shape of a tube, or pipe, section. Thus, a measuring tube can be flushly contacted. The curvature and the size are matched with those of the measuring tube for a good fit. Protrusion 7 has, in this case, a greater cross section transversely to the longitudinal axis of the coil core 3 than the passageway 5 in the coil body 2. Therefore, the protrusion 7 cannot pass into the passageway 5 of the coil body 2. The coil body 2 includes a first stop 8, especially on an end of the coil 4 facing the measuring tube. Stop 8 is thus arranged in this example on the coil body 2 between measuring tube and coil 4. Protrusion 7 and the stop 8 are, in such case, so formed that the protrusion 7 of the coil core 3, respectively the pole shoe, lies in the assembled state of the first coil component 1 against the first stop 8 of the coil body 2. This prevents a shifting of the coil core 3 relative to the coil body 2 along the longitudinal axis of the coil core 3 in a first direction facing away from the measuring tube. Stop 8 has especially essentially the shape of the protrusion 7, so that protrusion 7 lies flushly with large area against the stop 8. In this connection, a special seat could be provided in the coil body 3.

In manner known per se, the coil body 2 includes a second stop 9 on the end of the coil body 2 facing away from the measuring tube and therewith also from the coil 4. A securement element 12 bears on this second stop 9. Securement element 12 is, in such case, so connected with the coil core 3 by shape- and/or force interlocking, e.g. frictional interlocking, that the coil core 3 is secured under an axial stress on the coil body 2, thus a stress acting in the direction of the longitudinal axis of the coil core 3. The coil core 3 is, thus, secured to the coil body 2 with a securement element 12, which in the assembled state lies against the second stop 9 of the coil body 2, under a prestress, at least in the region of the coil 4. The stress thus acts at least in the region of the coil 4, especially between the first stop 8 and the second stop 9 of the coil body 2. The first stop 8 here lies outside of the passageway 5 of the coil body 2, respectively bounds such. Since here the coil core is formed as a pole shoe, the protrusion 7 is located on a first end of the coil core 3 in the assembled state facing the measuring tube. Roughly, coil core 3 can be referred to as T- or Y-shaped. The described seating locates the coil core 3 in the coil body 2 in a defined position. The guiding in the passageway 5 prevents overly large shiftings perpendicular to the longitudinal axis of the coil core 3. The prestress between both stops 8 and 9 prevents shifting along the longitudinal axis relative to the coil body 2.

The prestress and the securement by means of the securement element 12 is achieved, for example, by providing a groove 14 in the coil core 3 and at least one projection 13 on the securement element 12 for groove 14, respectively fitting into the groove 14 of the coil core 3, wherein coil core 3 and securement element 12 are connected with one another via a shape interlocking connection of groove 14 and projection 13. Securement element 12 can be embodied, in such case, as a piece of sheet metal with corresponding cutouts, such as sketched. Thus, the prestress in the coil core 3 is also enabled by the elasticity of the securement element 12 and the protrusion 7 of the coil core 3. Groove 14 is arranged especially on the second end of the coil core 3 lying opposite its first end.

If the illustrated securement element 12 with its projections 13 is pushed into the grooves 14 of the coil core 3, it lies, when the coil core 3 is in the passageway of the coil body 2, against the second stop 9 of the coil body 2. In order to secure the coil core 3 against a shifting in the other two spatial directions perpendicular to the longitudinal axis of the coil core 3, the coil body 2 includes a third stop 10 and a fourth stop 11, wherein the securement element 12 in the assembled state lies against the third and fourth stops 10 and 11, whereby then a shifting of the securement element 12 in a second direction perpendicular to the first direction is prevented and whereby a shifting of the securement element 12 in a third direction, perpendicular to the first and second directions is also prevented. In this example of an embodiment, thus, two stops 10 and 11 are utilized for defining the position of the securement element 12. In the case of a conical cutout in the securement element and a correspondingly formed stop on the coil body, only one stop would be sufficient, in order to prevent a shifting of the securement element in a second direction perpendicular for first direction and a shifting of the securement element in a third direction perpendicular to the first and second directions.

Further illustrated are two pole shoe sheet metal pieces 16, which in the assembled state of the magneto-inductive flow measuring device are arranged approximately air gap freely between coil core 3 and measuring tube. Alternatively, the provision of only one pole shoe sheet metal piece is also possible. Also, the application of three or more pole shoe sheet metal pieces should not be excluded here. The function of pole shoe sheet metal piece 16 is magnetic field guidance in the measuring tube. Therefore, the pole shoe sheet metal piece 16 and the coil core 3, respectively the pole shoe, are to be so dimensioned that the contact surface of the two components is very large and as gap free as possible. Naturally, the coil body 2 is to be correspondingly designed, especially when each pole shoe sheet metal piece 16 snaps separately into a depression 17, 18 provided in the coil body 2. Each pole shoe sheet metal piece 16 is secured in its own depression 17, 18 on the coil body, e.g. by snapping in. Unaffected by this, the contact surfaces of the pole shoe sheet metal piece 16 with the coil core 3, respectively the pole shoe and the measuring tube, should be as large as possible and gap free.

For the magneto-inductive flow measuring device, two coil components 1 are arranged on oppositely lying sides of a measuring tube. In such case, the coils 4 are so connected that the magnetic field produced by them points in a common direction, especially the field lines of the produced magnetic field point in the first direction along the longitudinal axes of the coaxial coil cores 3. Since involved here are two technically identical coil components 1 with equal components and complementary interfaces, which, thus, fulfill equal functions, and since also the coils 4 of the two coil components 1 are equally constructed, the coils 4 must be correspondingly connected. They lie essentially in two approximately parallel planes rotated relative to one another by 180°. The coil components 1 are constructively so embodied that they can be mounted only in a predetermined manner, this falling under the concept of poka yoke.

The first coil component 1 and the second coil component 1 are especially connected with one another by shape-interlocking. Engagement hooks 21 engage in eyes 20 provided and designed, respectively dimensioned, therefor in the respective connection partner, thus the respectively other coil component. This can happen with a small prestress coaxially with the longitudinal axis of the coil core 3, this meaning thus that the coil bodies connect with the measuring tube by force interlocking, e.g. frictional interlocking. Since the coil bodies are, however, manufactured of plastic, for example, creep in the synthetic material can in time lead to loss of this prestress. Alternatively, field guide-back sheet metal pieces are mounted on the coil bodies 1 and press the coil bodies 1 onto the measuring tube and connect with this by force interlocking, e.g. frictional interlocking. The coil bodies are in both cases so embodied that they, in each case, contact the measuring tube virtually air gap freely. Against twisting about a longitudinal axis of the measuring tube and against shifting along a longitudinal axis of the measuring tube, the mounted coil components 1 are secured by means of the electrodes of the electrode assemblies installed in the measuring tube or applied on the measuring tube.

In this example of an embodiment, each coil body 1 includes, moreover, at least one cable guide 19, here in the form of a groove and a cable hook, for guiding a cable, so that the guided cable of a predetermined length does not exceed a predetermined maximum separation from the coil body 2. This cable guide 19 is especially for guiding the coil cable (not shown in this figure). Another function of the cable guide 19 is to secure the cable against unwinding of the coil. Another cable guide can be provided in the coil bodies 1, in order to lead cable 15 of a measurement transmitter to the electrodes. For example, cables 15 are led in the passageway 5, especially through an additional cavity in the passageway 5. The coil core has in the region of the coil body 1 a rectangular basic form, which transitions in an end section outside of the coil body 1 into the shape of the pole shoe.

Figure 4:
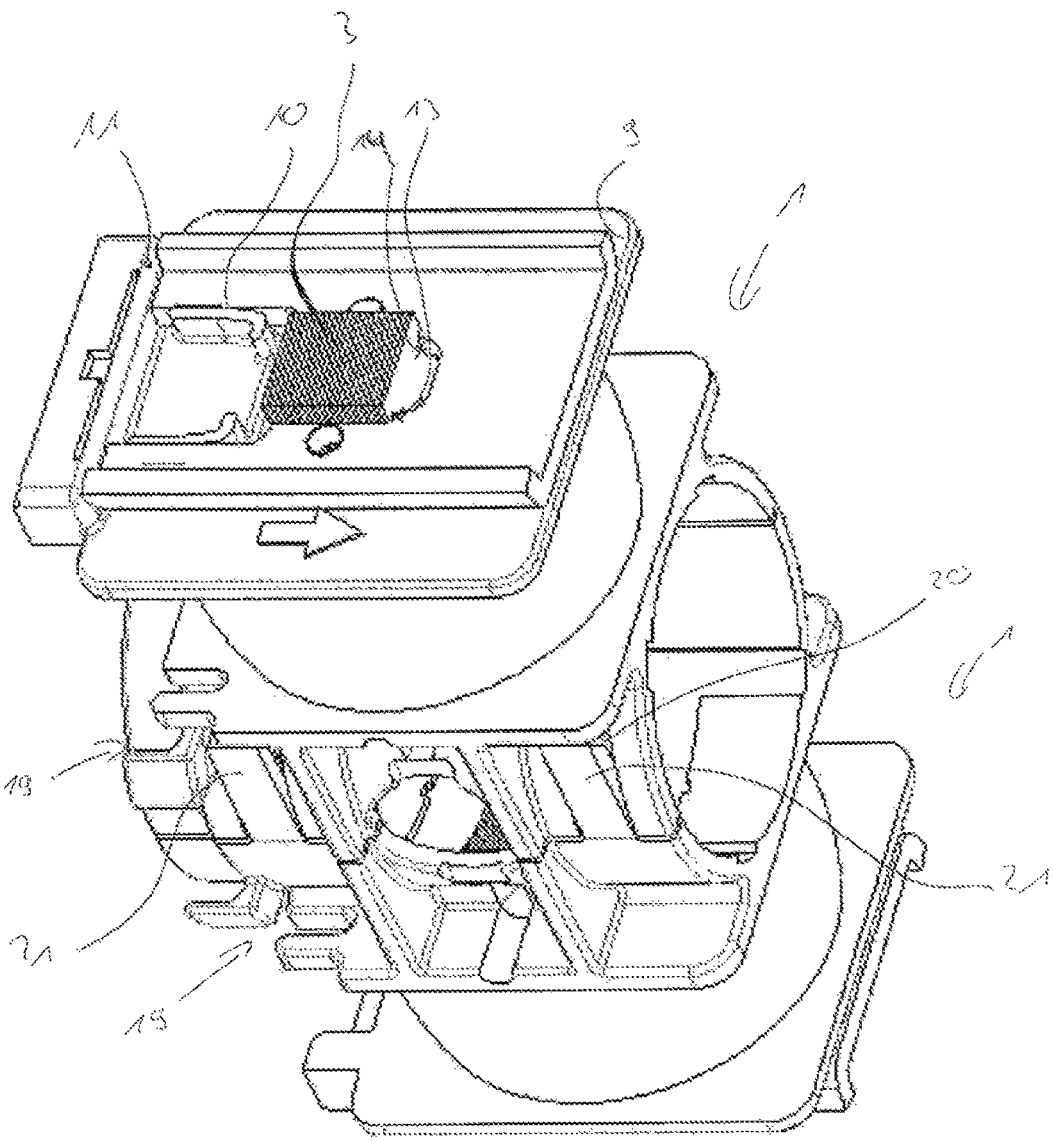
FIG. 4 shows perspectively, the two identical coil arrangements of FIG. 3 in the assembled state.

The cable guidance in FIGS. 3 and 4 occurs as in FIGS. 1 and 2. In such case, a cable 15 is led out from a plane perpendicular to the measuring tube axis and led around a lateral edge of the rectangular basic form of the coil core of the example.

FIG. 4 shows the two mounted coil components 1. Located in the two coil components 1 in the operationally ready state of the magneto-inductive measuring system is the measuring tube, which is not shown here, in order to simplify the drawing. Visible is the cable guide 19 in the form, in each case, of a groove and a cable hook. Also here, the guided cable is not shown for reasons of perspicuity. The cable would simply be inserted into the cable guide 19.

Likewise visible is the mounted securement element 12, which lies against the second, third and fourth stops 9, 10 and 11. In this way, it is only removable in the direction of the arrow. The projections 13 are inserted into the grooves 14 of the coil core 3 and form a projection-groove connection. The engagement hooks 21 of the one coil component 1 are engaged in the eyes 20 of the other coil component 1.

FIGS. 5-7 show a flow measuring device of the invention. An essential difference compared to the example of an embodiment illustrated in FIGS. 3 and 4 is the changed cable guide.

The coil core 3 of the coil arrangement 1 includes, in such case, preferably in a terminal region, two first cavities 30, which extend in a cutting plane 40 through the coil core. Cutting plane 40 extends perpendicularly to the measuring tube axis A. The cavities 30 are bounded laterally, in each case, by core sheet metal pieces. The cavities 30 are, as evident in FIG. 5, formed on the ends of the coil cores not formed as pole shoes. These ends have a rectangular cross section, wherein the cavities are U-shaped and are present in two oppositely lying sides of the rectangular shape.

The cable guidance of the magneto-inductive flow measuring device of the invention occurs in the cutting plane 40. The cable strands 15a and 15b are inserted into a guide in an introduction region above the coil core. Then, the cable strands are run in two different directions and at least in certain regions laterally guided past the coil core 3 and parallel to a longitudinal axis L. Finally, the cable strands 15a and 15b are led toward the measuring electrodes. The cable guidance of the two cable strands 15a and 15b is determined by the shape of the coil core 3 and the internal cavity of the coil body 2. The course of the so formed channel for the first cable strand 15a is symmetric to the second formed channel for the second cable strand 15b.

The variant of the invention shown in FIGS. 5-7 for a magneto-inductive flow measuring device can be assembled in such a manner that the cable strands 15a and 15b are run parallel to one another in front of the feedthrough in the field guide-back sheet metal pieces 22. The one or more field guiding sheet metal pieces 22 are then secured in the feedthrough by means of two screws 39. The connecting line 36 of the two screws 39 extend transversely, in such case, preferably 90°, to the cutting plane 40. For securing the screws 39, a plug-on element 37 is provided, which is embodied ring-shaped in FIG. 8. Plug-on element 37 is guided terminally over the coil core 3 during the assembly. A screw thread can be provided in the plug-on element 37. A securement element 12 is, analogously to FIGS. 3 and 4, drawn laterally onto the coil core 3 and along the two protrusions 7 of the coil core 3, which extend perpendicularly to the cutting plane 40. A cable guiding bushing 38 is provided above the coil core 3 for spacing the cable strands 15a and 15b from one another and for leading the strands toward the coil arrangement. As indicated in FIGS. 5-7, the cable strands 15a and 15b are insulated up to their connection with the measuring electrodes.

On the whole, the area perpendicular to the magnetic field in the case of the illustrated cable guidance is very small. In this way, the area defined by the cable strands 15a and 15b around the coil core 3 is minimized. Additionally, the voltage, which is induced in the cable strands, is minimized. This, in turn, enables a minimizing of the zero point error within the measuring period. Finally, a faster sampling rate can be implemented with the above-described cable guidance.

The invention claimed is:

1. A magneto-inductive flow measuring device for ascertaining flow of a measured medium through a measuring tube having a measuring tube axis, comprising:
    at least a first coil component having a coil body for accommodating a coil core of a coil, wherein said coil is wound on said coil body and wherein said coil core is arranged in a first passageway of said coil body, with a longitudinal axis of said coil core coaxial with said coil; and
    at least two cable strands arranged between said coil core and said coil body, wherein:
    said cable strands serve for tapping the signal of two or more measuring electrodes arranged on said measuring tube; and
    the cable strands extend within said coil component along a cutting plane, which extends perpendicular to said measuring tube axis;
    said coil core has at least two cavities, each of these cavities is provided for guiding a respective one of said cable strands.

2. The magneto-inductive flow measuring device as claimed in claim 1, wherein: said cavities and said coil core are arranged relative to said coil body in such a manner that the cable guidance of said two cable strands occurs symmetrically, at least in the region of said at least a first coil component.

3. The magneto-inductive flow measuring device as claimed in claim 1, wherein:
    said cable strands are led in certain regions in said at least a first coil component parallel to a longitudinal axis of said coil core.

4. The magneto-inductive flow measuring device as claimed in claim 1, wherein:
    said coil core is a single component of core sheet metal pieces connected with one another; and
    each of the cavities is bounded by two core sheet metal pieces.

5. The magneto-inductive flow measuring device as claimed in claim 1, wherein:
one of said two cable strands is led in such a manner that it has in said cutting plane two bends of greater than 30° and a third bend of greater than 15°.

6. The magneto-inductive flow measuring device, as claimed in claim 1, wherein:
said coil core has a protrusion;
said coil body has a first stop, which is arranged between said measuring tube and said coil;
said protrusion of said coil core in the assembled state of said at least a first coil component lies against said first stop of said coil body and prevents a shifting of said coil core relative to said coil body along the longitudinal axis of said coil core in a first direction facing away from said measuring tube;
said coil body has a second stop on an end of said coil body facing away from said measuring tube; and
said coil core is secured to said coil body with a securement element, which in the assembled state lies against said second stop of said coil body under a prestress along the longitudinal axis of said coil core between said first stop and said second stop of said coil body.

7. The magneto-inductive flow measuring device as claimed in claim 6, wherein:
said coil core has a groove and said securement element has at least one projection fitting said groove of said coil core; and
said coil core and said securement element are connected with one another via a shape interlocking connection of said groove and said projection.

8. The magneto-inductive flow measuring device as claimed in claim 7, wherein:
said coil body has at least a third stop;
said securement element in the assembled state lies against said third stop;
whereby a shifting of said securement element in a second direction, perpendicular to the first direction, is prevented and whereby a shifting of said securement element in a third direction, perpendicular to the first and second directions, is prevented.

9. The magneto-inductive flow measuring device as claimed in claim 1, wherein:
said coil core is formed as a pole shoe.

10. The magneto-inductive flow measuring device as claimed in claim 1, wherein:
at least one pole shoe sheet metal piece is arranged between said coil core and said measuring tube.

11. The magneto-inductive flow measuring device as claimed in claim 10, wherein:
each pole shoe sheet metal piece is separately snapped in a depression provided in said coil body in the assembled state of said coil body.

12. The magneto-inductive flow measuring device as claimed in claim 1, wherein:
said at least a first coil component and a second coil component are arranged oppositely lying on said measuring tube; and
said coils are so connected that the magnetic field produced by them points in a common direction.

13. The magneto-inductive flow measuring device as claimed in claim 12, wherein:
said at least a first coil component and said second coil component are connected with one another by shape-interlocking under a prestress coaxial with the longitudinal axis of said coil core.

14. The magneto-inductive flow measuring device as claimed in claim 12, wherein:
said at least a first coil component and said second coil component are complementarily constructed.

15. The magneto-inductive flow measuring device as claimed in claim 1, wherein:
said coil body has at least one cable guide for guiding a cable strand, so that the cable strand of a predetermined length does not exceed a predetermined separation from said coil body.

16. The magneto-inductive flow measuring device as claimed in claim 1, wherein:
one of said two cable strands is led in such a manner that it has in said cutting plane two bends of greater than 60° and a third bend of greater than 30°.

* * * * *